Feb. 19, 1935.   J. E. O'HEA   1,991,571
TANK CLOSURE LATCH
Filed Aug. 6, 1932
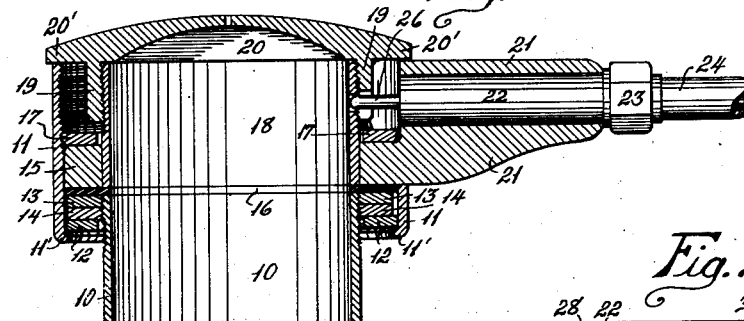
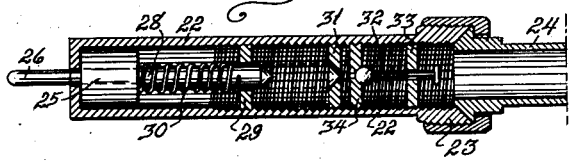
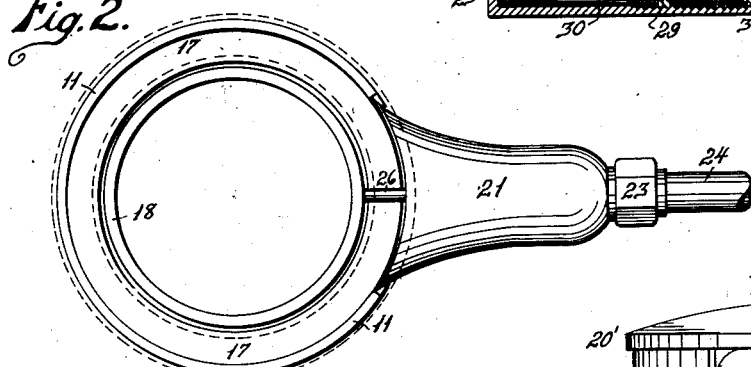
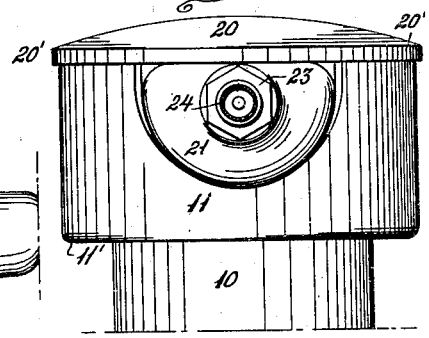
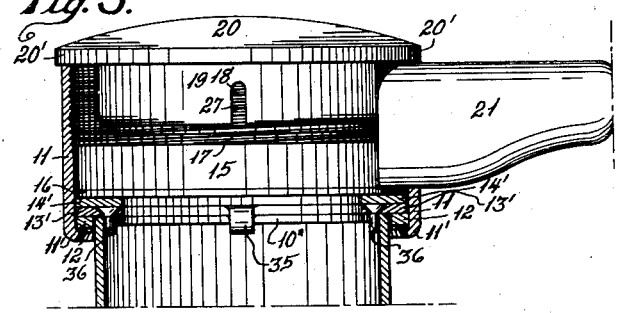
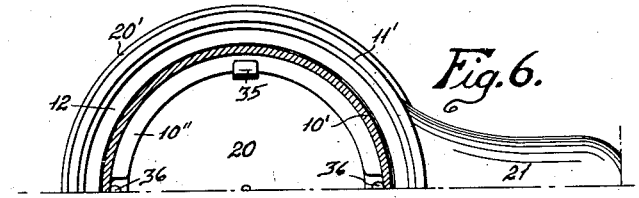
Inventor:
John Edward O'Hea
By Houck & Sward
Attorney.

Patented Feb. 19, 1935

1,991,571

UNITED STATES PATENT OFFICE 1,991,571

TANK CLOSURE LATCH

John Edward O'Hea, Denver, Colo., assignor of one-fourth to Mary E. O'Hea, Denver, Colo.

Application August 6, 1932, Serial No. 627,715

1 Claim. (Cl. 70—90)

This invention relates to means for preventing theft of liquids from tanks and more particularly to means for preventing the unauthorized siphoning of liquid fuel from automobile tanks, and has as an object to provide an improved construction for the closure member of such tanks and improved means automatically operable to latch said closure member against unauthorized removal.

A further object of the invention is to provide an improved tank latch assembly which may be readily mounted on and adapted to tank filler necks of various sizes and types.

A further object of the invention is to provide an improved pressure-operable latch in engaging relation with the closure member of a tank.

A further object of the invention is to provide an improved tank latch arranged for positive and efficient operation without the use of keys.

A further object of the invention is to provide an improved automobile tank latch which is normally in engaged relation and operatively connected for release with the motor elements of the automobile.

A further object of the invention is to provide an improved tank latch which is simple and inexpensive of manufacture and installation, positive, efficient and durable in use and susceptible of ready adaptation to automobile tanks as at present employed.

My invention consists in the construction, arrangement and combination of elements hereinafter described, pointed out in my claim and illustrated by the accompanying drawing, in which—

Figure 1 is a section diametrically of a preferred form of the invention as installed for practical use on a tank filler neck of common form. Figure 2 is a plan view of the showing of Figure 1, the closure member being removed and its normal position being indicated by dotted lines. Figure 3 is an elevation, partly in section, of the tank latch shown in Figure 1 as adapted for mounting on a tank filler neck of a type different from that shown in the first view. Figure 4 is an elevation of the arrangement shown in Figure 1 and at right angles to the showing of the latter figure. Figure 5 is a detail section, on an enlarged scale, axially of the latch means employed in the improvement. Figure 6 is a half bottom plan, partly in section, of the modification illustrated in Figure 3.

In the construction of the improvement as shown in Figures 1, 2, 4 and 5, the numeral 10 designates a portion of a tank filler neck, which neck is cylindrical and provided at its upper end with external threads, as is common practice; it being customary to close the tank neck with a cap adapted to be screwed onto the threaded portion of the neck. When it is desired to mount the improvement on the tank neck 10, the normal closure member mounted thereon is removed and discarded and a hollow, cylindrical sleeve 11, open at each end and of greater diameter than the tank neck and formed with an inturned flange 11' at its lower end whereon is supported a ring 12, is mounted in telescoping relation with the neck 10, the ring 12 having an inner diameter such as to permit it to slip freely on said neck and an outer diameter substantially equal to the internal diameter of the sleeve 11. After the sleeve 11 and ring 12 have been mounted on the neck 10, a pair of lock nuts 13, 14 formed with internal threads adapted to engage with the external threads of the tank neck are mounted on and clamped firmly together adjacent the upper end of said neck, the greater diameter of said lock nuts being slightly less than the internal diameter of the sleeve 11, so that said sleeve may be drawn upwardly past and in enclosing relation with said lock nuts until arrested by engagement of the ring 12 with the lowermost of the said lock nuts. The sleeve 11 being positioned as above described, a relatively thick ring 15 of a size to slip freely within the sleeve 11 is inserted in said sleeve to rest on and above the upper of the lock nuts, a gasket 16 preferably being interposed between said ring 15 and the upper of the lock nuts, and a lock ring 17 is mounted in threaded engagement within the upper portion of the sleeve 11 and screwed down against the upper surface of the ring 15, thus drawing the sleeve 11 upwardly until the ring 12 bears tightly against the lower of the lock nuts and clamping the elements 11, 12, 13, 14, 15 and 16 closely together in fixed relation on the upper end of the neck 10. Fixed to and in concentric relation with the ring 15, a relatively short tubular element 18 rises above said ring through the lock ring 17 and is positioned with its upper end in substantially the same plane with the upper end of the sleeve 11, the element 18 thus acting as an extension of the neck 10. The upper portion of the element 18 is externally threaded to coact with internal threads of an annular flange 19 formed on a cap or closure member 20, which latter member is provided with a radially extending flange 20' adapted to overlie and project slightly beyond the upper end of the sleeve 11, thus providing a manually-removable member operable to entirely close the upper end of the tank neck and attachments thereto.

Formed integrally with the ring 15, an offset portion 21 extends upwardly and radially therefrom through an opening formed in one wall of the sleeve 11, said portion 21 being so constructed and arranged as to enclose and support a cylindrical element 22 with its axis disposed radially of the sleeve 11 and above the plane of the lower margin of the cap flange 19 and its inner end spaced outwardly from the element 18 sufficiently to clear the ring 17. The inner end of the element 22 is closed save for a relatively small, axial hole and the outer end of the element is provided with suitable connections, indicated at 23, whereby attachment may be had with one end of a tube or pipe 24 operatively communicating with the vacuum tank, intake manifold or other reduced pressure portion of an internal combustion engine (not shown). The element 22 is provided with a straight, uniform bore communicating with the tube or pipe 24, the major portion of which bore is internally threaded, that portion of the bore adjacent its closed end being left smooth to provide a slide bearing for a plunger member 25 closely fitted for axial reciprocation therein. An axial pin 26 is formed on the plunger 25 and arranged to project through the hole in the otherwise closed end of the element 22, the length of said pin 26 being sufficient to bridge across the lock ring 17 and engage in a hole in the tubular element 18 when the plunger 25 is at the inner limit of its range of travel, downwardly-opening notches 27 being provided in the flange 19 of the closure member in such number as may be desired to permit full extension of the plunger pin from the element 22, so that, when said pin is extended through one of the notches 27 the flange 19 and associated closure member is held against rotation and removal thereof is prevented. To hold the plunger 25 and its pin 26 at the inner limit of the element 22, a stem 28 is formed axially of the plunger 25 and extends oppositely from the pin 26, said stem extending through a guide plate 29 adjustably threaded in the bore of the element 22 and an expansive coil spring 30 is mounted on said stem 28 and acts between the plunger 25 and plate 29 to yieldingly hold the plunger in the position shown in Figure 5. With the arrangement above described it is obvious that so long as no pressure reduction is had through the tube 24 the plunger 25 will be held by the spring 30 in the position shown in Figures 1 and 5, in which position the pin 26 traverses a notch in the flange 19 and latches the closure member against rotation and consequent removal. Thus when the engine to which the tube 24 is connected is at rest the cap 20 is securely latched in place. When the engine is operating, the normal pressure in the tube 24 is reduced, which condition permits normal atmospheric pressure to push the plunger 25 outwardly of the element 22 against the pressure of the spring 30, simultaneously withdrawing the pin 26 from its engagement with the flange 19 and permitting removal of the closure member.

In order to prevent pressure reduction within the tube 24 from acting on the contents of the tank, the free end of the stem 28 is tapered to form a valve and a plate 31, formed with a valve seat wherewith said stem may coact at times, is threadedly mounted within the bore of the element 22 and positioned to be engaged by said stem valve when the plunger 25 is adjacent the outer limit of its range of travel. It may be expedient, at times, to provide means whereby the latching action of the pin 26 may be retarded, to which end a spring-pressed ball-valve 32 is suitably mounted within the element 22, as by means of a plate 33 threadedly engaging within the bore of said element, in position to coact with and normally close against a valve seat carried by a plate 34 threadedly mounted for adjustment within the bore of said element, the ball-valve 32 unseating under pressure reduction within the tube 24 to permit unlatching of the pin 26 and closing against its seat when normal pressure is restored, thereby sealing the chamber behind the plunger 25 and retarding the return action of the plunger, regulation of the retarding action being had through relative adjustment of the plates 33 and 34.

In the construction according to Figures 3 and 6, the essential elements of the improvement are in all respects identical with those previously described, the only difference in the last noted figures residing in the type of tank filler neck and the method of attaching the tank latch thereto. In Figures 3 and 6 is shown a tank neck of "clip" type wherein an inwardly-extending, arcuate flange on the upper end of the neck is provided with opposed notches and acts in place of the external threads previously described as a means for attaching the conventional closure member. In the illustration of this modification, the tank neck is indicated at 10' and its notched, arcuate flange at 10". To mount the improvement on this type of neck, the lock nuts 13 and 14 are dispensed with and flat washers 13' and 14' provided. The washer 13' is formed with a pair of curved lugs 35 so positioned as to enter the neck through the notches of the flange 10" and embrace said flange to prevent lifting away of said washer when the latter has been rotated slightly on the flange, and is further provided with a pair of holes adapted to register with the notches of the flange 10" when the lugs 35 are in locked relation with said flange, pins 36 loosely inserted in said holes engaging the notches of said flange to prevent relative rotation between the flange and washer. The washer 14' is plain and is mounted in covering relation with the pins 36 to prevent the removal or displacement thereof. With the washers 13' and 14' substituted for the lock nuts 13 and 14, the improvement is mounted on the "clip" type neck in the manner previously described to function as above desscribed.

It is obvious that the improvement may be constructed in one size only and adapted to tank necks of varying sizes by variation only of the inner diameters of the ring 12, nuts 13 and 14 and washers 13' and 14', thus providing a device readily attachable to any given tank commonly employed on automobiles.

Since when the engine is at rest the tank closure is securely latched, and since access to the engine is generally difficult without proper keys and due authority, it is apparent that the improvement presents a tank latch of high practical efficiency. Duly authorized persons can release the tank latch by simply starting the engine.

Since many changes in the specific form, construction and arrangement of the elements shown and described may be had without departing from the spirit and principle of the invention, I wish to be understood as being limited solely by the scope of the appended claim rather than by any details of the illustrative showing and foregoing description.

I claim as my invention—

In a device of the character described having a tank filler neck and a closure member threadedly engaging said neck, means automatically operable to latch said closure member against rotation, said means comprising vertical notches in the threaded flange of the closure member, a boss offset laterally from and radially of said neck, a radial chamber in said boss, a plunger mounted for reciprocation within said chamber, a pin projecting from the inner end of said plunger in position to engage one of the vertical notches of the closure member, and spring means normally operable to urge said plunger and pin toward said closure member; together with valve means in said chamber closable by said plunger at the outer limit of its range of travel, a check valve in said chamber operable to retard inward travel of said plunger and pressure reducing means communicating with said chamber and operable to permit atmospheric pressure to act on and release the plunger pin from its latching engagement with said closure member.

JOHN EDWARD O'HEA.